Patented Feb. 6, 1934

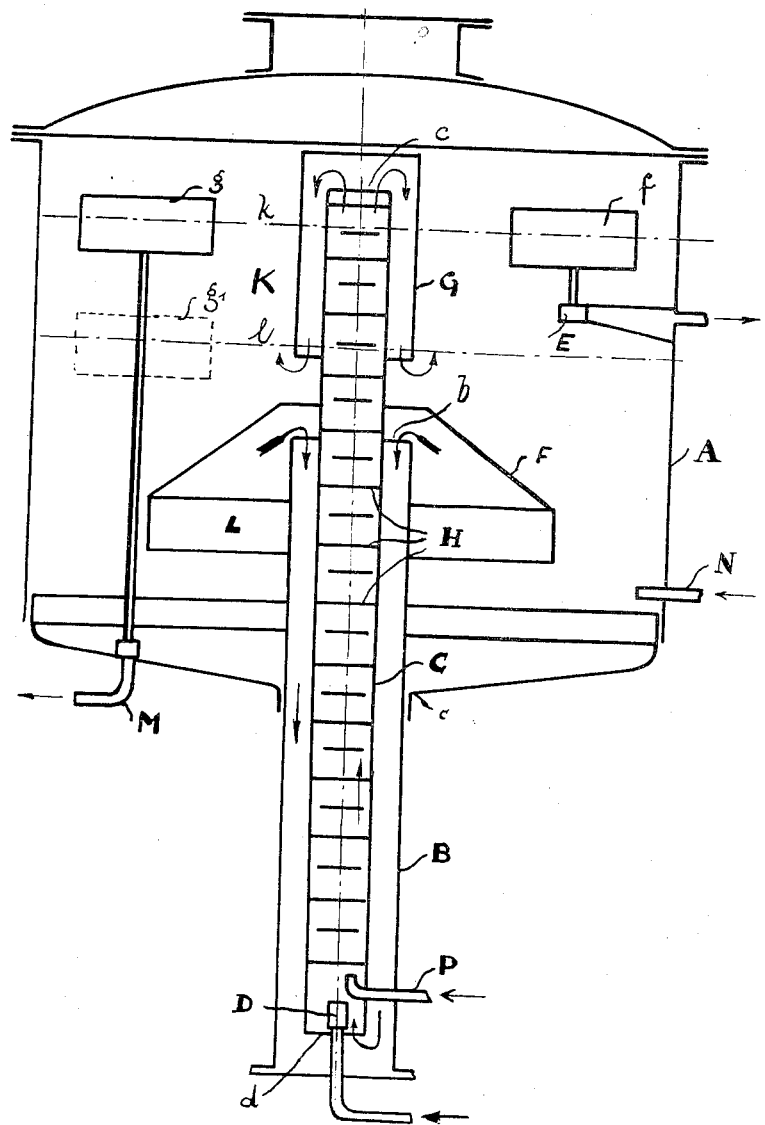

1,945,766

UNITED STATES PATENT OFFICE 1,945,766

AUTOCLAVE

Thomas Walter Barber, London, England

Application September 13, 1928, Serial No. 305,853, and in Great Britain September 30, 1927

7 Claims. (Cl. 210—48)

This invention relates to improvements in the construction and operation of autoclaves or similar vessels for subjecting solids or liquids, or both, to the action of high or low temperatures or pressures; and it has for its object the provision of means or devices for enabling the continuous operation of such apparatus.

An autoclave constructed in accordance with the invention, and designed, for example, for effecting the separation of oil from a magma of oil and water, is illustrated in diagrammatic vertical section in the accompanying drawings.

As therein shown, the improved apparatus comprises an outer vessel or chamber A of relatively-large capacity, within which is arranged an elongated vertical vessel or tube B; the latter containing, in turn, a second tubular vessel C, which is of considerably greater length than tube B, so that its upper portion projects outwardly beyond said tube and extends upward into a hood G located above and in line with the tube.

The inner vessel or tube B is open at its top to communicate with the interior of chamber A, and has a tight joint with the bottom c of said chamber at the point where it passes outward therethrough. On the other hand, the tube or vessel C, which is of appreciably smaller diameter than tube B, has its lower end d open to enable the passage therethrough of the liquid contained in tube B, while its upper end e opens within the inverted cup or tube G adjacent the top thereof, thus providing communication between tube C and chamber A, as will be apparent from the arrows. Hence, the liquid L in said chamber A is free to flow into and downwardly through tube B, entering the latter through its open top b, and then enter tube C through its open bottom d and flow upwardly through the same, finally emerging at e from tube C.

In addition to hood G, a second hood F, preferably of conical or tapering form, may be arranged within chamber A at a suitable distance below hood G and likewise encircling tube C; both hoods serving to assist the circulation of the liquid in the chamber, but being more or less optional in use.

At or near the bottom of the innermost tube C, a jet D or other convenient means is provided for the introduction of the magma into said tube, and the latter is further provided with a vertical set of baffles H so disposed as to check the rise of the magma and cause it to become effectively commingled with the liquid. The baffles might be replaced, however, by suitable mechanical agitating and mixing devices; the extension of the tube B and C below chamber A insuring the agitation and mixing being carried out to an adequate degree. Heating may be effected by the addition of steam, either directly or through heating coils, specific illustration of which is deemed unnecessary.

The oil, which is indicated at K, and its level at k, separates out from the liquid L and floats on its surface l, while the impurities (which are heavier) sink in the liquid and collect on the bottom c of chamber A, from which they are discharged, together with the foul liquid, through a valve M, here shown as connected to a float g that rests on the oil to be opened and closed thereby in accordance with changes in the oil level. The said float may, however, be conveniently arranged at g' in some instances.

To secure the constant discharge of the oil, a valve E, controlled by a float f or other suitable device actuated by the rise and fall of the oil level, is utilized; said valve being situated at such a point as to be always submerged in, or in contact with, the stratum of oil. Other discharging means, such as pumps or siphons, may be utilized in place of those described above.

The operation is as follows: The magma is fed into tube C by way of jet D, with or without the addition of clarifying or precipitating media, where it meets and mixes with the liquid L contained in chamber A and which enters into and flows downward through tube B; the said liquid entering into tube C through its open bottom d. At the top of the tube C, the mixture discharges into the hood G (assuming that it is used) and emerges therefrom at or near the level l; the oil separating out and collecting on the surface of the liquid, while the impurities sink in the liquid and are precipitated partly or wholly on the chamber wall c, whence they are discharged through drain valve M. The relatively-clear liquid then passes back into tube B, assisted by the action of the conical hood F, to continue the same circuit as just described; fresh liquid being introduced, as needed, into chamber A through an inlet pipe N, or else into the lower portion of tube C through a separate inlet pipe P, the liquid being charged in either case with suitable clarifying or precipitating media.

The valves E and M provide for the discharge of the oil and the liquid and impurities at the same rate that they are fed into the apparatus, and the operations consequently proceed continuously; the feed being conveniently effected by means of a pump.

It will be understood that, for the separation of materials having different physical characteristics, the arrangements described above may be modified. For instance, separation may be effected in some cases without circulation of the liquid contained in chamber A; the necessary treatment being effected by the addition to the liquid, previous to its admission through jet D or inlet P, of the material required to promote action, in which event the tube B may be omitted.

Moreover, the matter to be extracted may be the precipitate, and the super-natant water may be the discharge to waste, the method of operation remaining the same.

I claim as my invention:—

1. In an autoclave, the combination of a closed chamber to contain a circulation liquid; a long tube extending axially through the bottom thereof; a short tube concentric with the first tube and spaced therefrom, both tubes being open at their upper ends, and the said first tube also having its lower end open to admit circulation liquid from the second tube; means for injecting liquid to be treated into the lower end of said first tube for admixture with the circulation liquid; and means for effecting automatic discharge of the separated liquid.

2. An apparatus according to claim 1, in which additional means are provided for effecting the automatic removal of solids precipitated from the treatment liquid.

3. An apparatus according to claim 1, in which additional means are provided for effecting the automatic removal of solids precipitated from the treatment liquid; both the automatic discharge means and the automatic removing means being constituted by float-operated valves.

4. An apparatus according to claim 1, in which the long tube is provided with internal baffles to check the rise of the treatment liquid therein and thereby cause admixture of that liquid with the circulation liquid.

5. An apparatus according to claim 1, in which the open upper end of the short tube has a hood fitted over it to direct the circulation liquid thereinto.

6. An apparatus according to claim 1, in which the open upper end of the short tube has a hood fitted over it to direct the circulation liquid thereinto; and in which the long tube is provided with internal baffles to check the rise of the treatment liquid therein and thereby cause admixture of that liquid with the circulation liquid.

7. In an apparatus for separating mixed liquids by gravity, the combination of a closed chamber, means for continuously feeding the mixture to be separated into said chamber, said chamber being of a sufficiently large volume to effect a separation of the liquids into distinct layers by gravity, means for continuously discharging the lighter separated liquid from a point near the surface thereof, means for continuously discharging the heavier separated liquid from a point near the bottom of said chamber, the means for feeding the mixture into the chamber being positioned to discharge the mixture therein at a point between the outlets and intermediate the layers of separated liquids, a conduit for withdrawing a portion of the intermediate layer of liquid at a point between the lower outlet and the inlet for the mixture and for mixing the withdrawn liquid with the incoming mixture for recirculation, and a hood positioned in said chamber directly above the intermediate point at which the liquid is withdrawn for recirculation and extending laterally and downwardly over the end of said conduit to avoid withdrawal of the lighter separated liquid and the incoming mixture from the chamber.

THOMAS WALTER BARBER.